(12) United States Patent
Kawai et al.

(10) Patent No.: US 7,256,765 B2
(45) Date of Patent: Aug. 14, 2007

(54) ELECTROPHORETIC DEVICE, METHOD FOR DRIVING THE SAME, AND ELECTRONIC APPARATUS

(75) Inventors: Hideyuki Kawai, Nagano-ken (JP); Tatsuya Shimoda, Nagano-ken (JP)

(73) Assignee: Seiko Epson Corporation (JP)

( * ) Notice: Subject to any disclaimer, the term of this patent is extended or adjusted under 35 U.S.C. 154(b) by 692 days.

(21) Appl. No.: 10/109,611

(22) Filed: Mar. 28, 2002

(65) Prior Publication Data
US 2002/0196526 A1 Dec. 26, 2002

(30) Foreign Application Priority Data
Mar. 30, 2001 (JP) ............................. 2001-101314
Mar. 27, 2002 (JP) ............................. 2002-089835

(51) Int. Cl.
*G09G 3/34* (2006.01)
(52) U.S. Cl. ..................... 345/107; 345/85; 345/103
(58) Field of Classification Search ......... 345/85–107; 359/295, 296
See application file for complete search history.

(56) References Cited

U.S. PATENT DOCUMENTS

| | | | |
|---|---|---|---|
| 6,400,492 B1 * | 6/2002 | Morita et al. ............... | 359/296 |
| 6,515,790 B2 * | 2/2003 | Miyamoto et al. ........... | 359/296 |
| 6,639,578 B1 * | 10/2003 | Comiskey et al. ........... | 345/107 |
| 6,693,620 B1 * | 2/2004 | Herb et al. ................. | 345/107 |
| 2001/0009352 A1 * | 7/2001 | Moore ........................ | 313/582 |

FOREIGN PATENT DOCUMENTS

| JP | 50-15115 | 4/1969 |
|---|---|---|
| JP | 2-51325 | 10/1988 |

* cited by examiner

*Primary Examiner*—Vijay Shankar
(74) *Attorney, Agent, or Firm*—Harness, Dickey & Pierce, P.L.C.

(57) ABSTRACT

An electrophoretic device according to the present invention comprises electrophoretic dispersion including a liquid-phase dispersion medium and electrophoretic particles dispersed therein, in which the positions of the electrophoretic particles are controlled in accordance with an electric field applied thereto. In addition, the electrophoretic device further has a first means for applying a first voltage so that a first dispersion state of the electrophoretic particles is changed into a second dispersion state and a second means for applying a second voltage so that the second dispersion state is substantially sustained. The electrophoretic device described above has superior image-sustaining properties.

14 Claims, 15 Drawing Sheets

(a)

(a)

(b)

(a)

(b)

(c)

ELECTROPHORETIC DEVICE, METHOD FOR DRIVING THE SAME, AND ELECTRONIC APPARATUS

TECHNICAL FIELD

The present invention relates to electrophoretic devices using an electrophoretic dispersion containing a liquid-phase dispersion medium and electrophoretic particles, to methods for driving the electrophoretic devices, and to electronic apparatuses.

BACKGROUND ART

Heretofore, an electrophoretic device as shown in FIG. 10(a) has been known.

This electrophoretic device comprises electrodes 3 formed on a first substrate 1, transparent electrodes 4 formed on a second substrate 2, an electrophoretic dispersion 10 filled between the electrodes 3 and the transparent electrodes 4, and spacers 7 preventing the electrophoretic dispersion 10 from flowing out. In the figure mentioned above, a cross-section of one pixel of the display device is shown.

The electrophoretic dispersion 10 is formed of a liquid-phase dispersion medium 6 and electrophoretic particles 5 dispersed in this liquid-phase dispersion medium 6. In addition, the liquid-phase dispersion medium 6 and the electrophoretic particles 5 are colored so as to have colors different from each other.

To this electrophoretic device, voltage sources 9a and 9b for applying voltages, which are electrically opposite to each other, are connected via a switching element 8. That is, the electrode 3 is connected to ends of the voltage sources 9a and 9b, and the electrode 4 is connected to the other ends of the voltage sources 9a and 9b via the switching element 8. When an electrical circuit is formed as described above, the direction of a voltage to be applied can be changed using the switching element 8. By changing the direction of a voltage to be applied, the electrophoretic particles are gathered at a desired electrode side, so that a desired display can be created. That is, when the electrophoretic particles 5 are negatively charged, as shown in FIG. 10(b), by applying a voltage supplied from the voltage source 9a, the electrophoretic particles 5 can be gathered at the transparent electrode 4 side, which is close to an observer side. In this state, the observer sees the color of the electrophoretic particles 5. On the other hand, as shown in FIG. 10(c), by applying a voltage supplied from the voltage source 9b, the electrophoretic particles 5 can be gathered at the electrode 5 side, which is far from the observer side. In this state, the observer sees the color of the liquid-phase dispersion medium 6. When the electrophoretic particles 5 are positively charged, the moving direction of the particles is opposite to that described above.

As described above, when the structure shown in FIG. 10(a) is used, two colors can be displayed in accordance with the direction of a voltage to be applied, and when the structure shown in this figure is used in each pixel, an electrophoretic device can be realized.

[Problems to be Solved by the Invention]

When the electrophoretic device described above is formed on a substrate having flexibility, it is anticipated that electronic paper may be realized. However, in this case, after display information is saved by applying a voltage, it is necessary to sustain the display information for a long period of time.

A technique for sustaining the display information has been disclosed in Japanese Examined Patent Application Publication No. 50-15115. In this publication, a dispersion medium, which is solid at room temperature and is softened by heating or using solvent, is used. However, when the technique described in this publication is used, a material for the dispersion medium is limited, and in addition, a complicated step such as heating is required when images are saved.

In addition, another technique has been disclosed in Japanese Unexamined Utility Model Publication No. 2-51325. In the technique described in this publication, liquid crystal is used as the dispersion medium. In the technique described above, there has been a problem in that a material for the dispersion medium is limited.

Furthermore, in U.S. Pat. No. 5,961,804, the structure in which a charge having a polarity opposite to that of particles is kept to the inside walls of microcapsules containing a dispersion has been disclosed. However, in this case, a method for keeping a charge is difficult, and a problem may arise in that the manufacturing process becomes complicated. In addition, a problem may also arise in that a material for the microcapsules is limited.

In addition, in Japanese Unexamined Patent Application Publication No. 3-213827, a technique in which an image is refreshed by periodically applying a driving voltage has been disclosed. However, in this case, time control for periodically applying a driving voltage is complicated, and as a result, there has been a problem in that the size of an electrical circuit portion is increased. Accordingly, it has been difficult to apply these above techniques to the formation of electronic paper.

The present invention was made in order to solve the problems described above, and an object of the present invention is to provide an electrophoretic device that can be formed of a simple electrical circuit by using materials which are not so limited and that has significantly improved image-sustaining properties for realizing electronic paper.

SUMMARY OF THE INVENTION

In order to solve the problems described above and to achieve the object described above, a first electrophoretic device of the present invention comprises: a first electrode and a second electrode, at least one of the electrodes being formed of a transparent material; and an electrophoretic dispersion which contains at least a liquid-phase dispersion medium and electrophoretic particles and which is provided between the first electrode and the second electrode. In the electrophoretic device described above, a driving voltage is applied across the first electrode and the second electrode to allow the electrophoretic particles to localize at one of the first electrode side and the second electrode side by electrophoresis, and subsequently, a sustaining voltage having a lower level than that of the driving voltage is continuously applied across the first electrode and the second electrode.

In the electrophoretic device described above, by applying the driving voltage in order to rewrite a display and then continuously applying the sustaining voltage having a lower level than that of the driving voltage until the display is rewritten, the electrophoretic particles localizing at one of the first electrode side and the second electrode side can be sustained, and hence, the image-sustaining properties can be improved.

The electrophoretic device described above may further comprise: first power source means for supplying the driving voltage; and second power source means for supplying the sustaining voltage.

In the electrophoretic device described above, at least one part of the first power source means and at least one part of the second power source means may be common to each other. According to the structure described above, the total size of the first power source means and the second power source means can be decreased.

In the electrophoretic device described above, at least one of the first power source means and the second power source means may comprise a battery or a capacitor. Since the battery and the capacitor are highly efficient and highly reliable power generation element and capacitive element, respectively, when these are incorporated as the power source means as described above, the efficiency and the reliability of the power source means can be improved.

In the electrophoretic device described above, the electrophoretic dispersion may be contained in microcapsules. According to the structure described above, the electrophoretic dispersion becomes easier to handle, and in particular, when a layer composed of the electrophoretic dispersion is formed on a substrate having flexibility, the manufacturing process can be simplified.

In the electrophoretic device described above, the electrophoretic dispersion may be divided by at least one partition. When the electrophoretic dispersion is divided by the partitions, unnecessary movement of the particles and unnecessary agglomeration therebetween can be prevented, and as a result, the display quality can be improved.

In the electrophoretic device described above, the level of the sustaining voltage is preferably not more than half that of the driving voltage. When the level of the sustaining voltage is not more than half that of the driving voltage, while the image-sustaining properties is sustained sufficiently in practice, the electrical power for sustaining the image can be decreased.

A second electrophoretic device of the present invention comprises: electrophoretic dispersion which contains a liquid-phase dispersion medium and electrophoretic particles dispersed therein, the positions of the electrophoretic particles being controlled in accordance with a electric filed applied thereto; first means for applying a first voltage to the electrophoretic particles to change a first dispersion state thereof into a second dispersion state; and second means for applying a second voltage to the electrophoretic particles so as to substantially sustain the second dispersion state. In order to perform display by using the second electrophoretic device of the present invention, the display can be performed by applying the first voltage to allow the electrophoretic particles to localize. In the case described above, the second dispersion state corresponds to the state in which the electrophoretic particles localize for creating a desired display. In addition, when the second voltage is applied so as to restrict the diffusion of the electrophoretic particles, the state in which the electrophoretic particles localize is sustained, and hence, a desired display can be created for a long period of time.

As the configuration of the second electrophoretic device of the present invention, the configuration similar to that of the first electrophoretic device may also be used.

For example, in the second electrophoretic device of the present invention, the absolute value of the first voltage is preferably larger than the second absolute voltage.

In the second electrophoretic device described above, the electrophoretic dispersion may be contained in microcapsules.

In the second electrophoretic device described above, the electrophoretic dispersion may be disposed in a plurality of recesses each provided with a partition member around the periphery thereof.

An electronic apparatus of the present invention comprises the electrophoretic device described above.

A method for driving an electrophoretic device, according to the present invention, is a method for driving an electrophoretic device including electrophoretic dispersion which contains a liquid-phase dispersion media and electrophoretic particles dispersed therein, the positions of the electrophoretic particles being controlled in accordance with an electric field applied thereto. The method described above comprises a first step of applying a first voltage to the electrophoretic particles so as to change a first dispersion state thereof into a second dispersion state; and a second step of applying a second voltage to substantially sustain the second dispersion state.

In the method for driving the electrophoretic device described above, the absolute value of the first voltage is preferably larger than that of the second voltage.

DETAILED DESCRIPTION OF PREFERRED EMBODIMENTS

Figure 1:
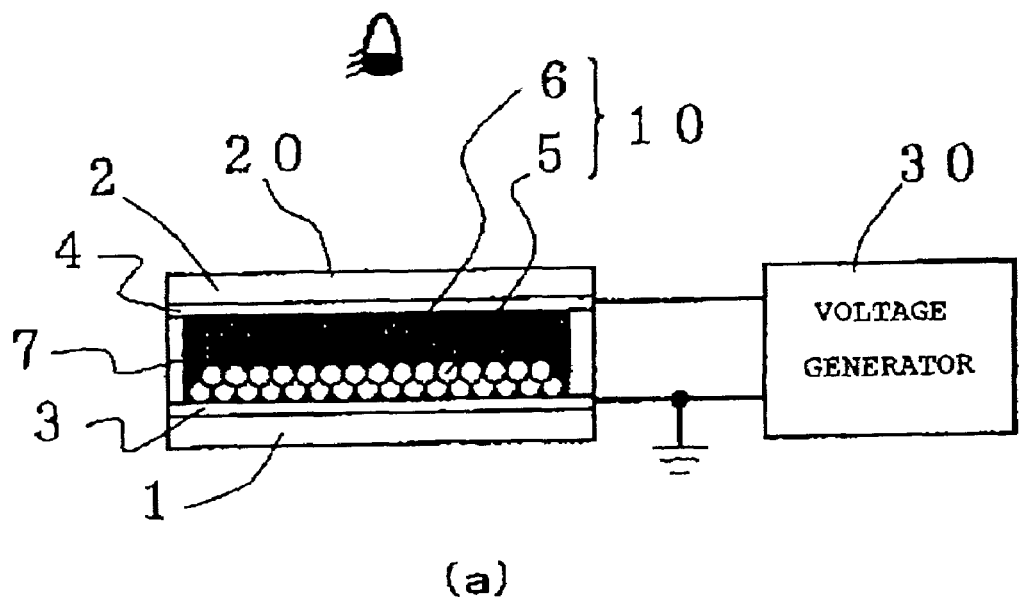
FIG. 1 includes views showing an electrophoretic device of a first embodiment according to the present invention, FIG. (a) is a view showing the structure thereof, and FIG. (b) is a view showing a waveform of a voltage output from a voltage generator in FIG. (a).
Figure 1:
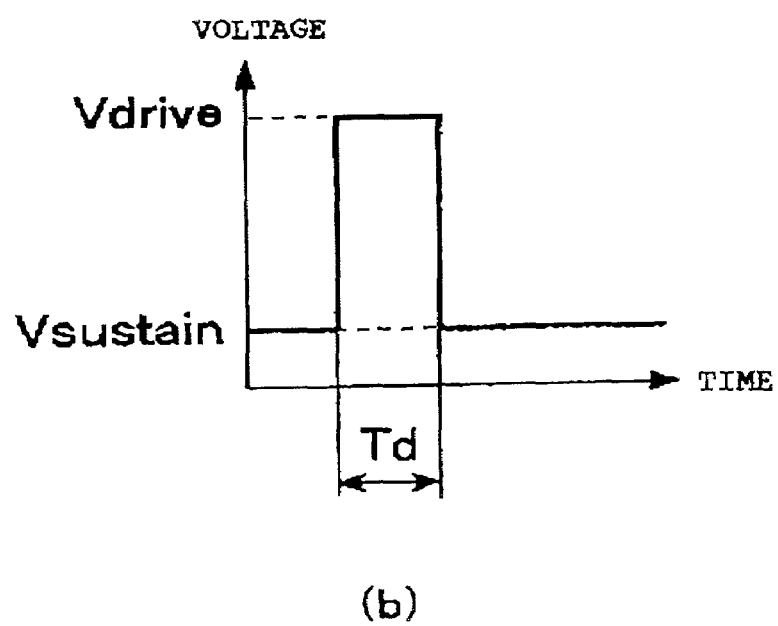

Next, embodiments of the present invention will be described with reference to figures. In the figures used for the description below, the same reference numerals designate the same elements.

FIRST EXAMPLE

FIG. 1 is a view showing an electrophoretic device of a first embodiment according to the present invention.

As shown in FIG. 1(a), an electrophoretic device 20 of an embodiment of the present invention comprises a first substrate 1, a second substrate 2, and a spacer 7 provided along the peripheries of the first substrate 1 and the second substrate 2 for maintaining a predetermined gap therebetween. The second substrate 2 is formed of a light-transmissive plate, such as a transparent glass. On the surface of the second substrate 2 opposing the first substrate 1, a transparent electrode 4 is formed. The transparent electrode 4 is formed of, for example, indium tin oxide (ITO).

The first substrate 1 is not always necessary to be transparent, but is usually formed of, for example, a glass substrate. In addition, on the surface of the first substrate 1 opposing the second substrate 2, an electrode 3 is formed. The electrode 3 is not always necessary to be a transparent electrode, but is usually formed of, for example, an ITO film.

The spacer 7 functions to seal a closed space formed by the first substrate 1, the second substrate 2, and the spacer 7, and is formed of a sealing material such as an epoxy resin. In general, the thickness (distance between the electrodes) of the spacer 7 is approximately 20 μm to 1 mm.

In the closed space formed by both substrates 1 and 2 and the spacer 7, an electrophoretic dispersion 10 is filled, and this electrophoretic dispersion 10 contains a liquid-phase dispersion medium 6 and electrophoretic particles 5 which are charged and dispersed in this dispersion medium.

As the liquid-phase dispersion medium 6, for example, there may be mentioned alcoholic solvents, such as water, methanol, ethanol, isopropanol, butanol, octanol, and methyl cellusolve; various esters, such as ethyl acetate and butyl acetate; ketones, such as acetone, methyl ethyl ketone, and methyl isobutyl ketone; aliphatic hydrocarbons, such as pentane, hexane, and octane; alicyclic hydrocarbons, such as cyclohexane and methyl cyclohexane; aromatic hydrocarbons, some of which include benzene derivatives having a long alkyl group, such as benzene, toluene, xylene, hexylbenzene, heptylbenzene, octylbenzene, nonylbenzene, decylbenzene, undecylbenzene, dodecylbenzene, tridecylbenzene, and tetradecylbenzene; halogenated hydrocarbons, such as methylene chloride, chloroform, carbon tetrachloride, and 1,2-dichloroethane; salts of carboxylic acids; and other various organic solvents. These solvents may be used alone or in combination together with surfactants or the like.

In addition, the electrophoretic particles 5 are organic or inorganic particles (polymer or colloid) having a property of traveling in a dispersion medium by electrophoresis due to the potential difference. For example, there may be mentioned black pigments, such as aniline black and carbon black; white pigments, such as titanium dioxide, zinc flower, and antimony trioxide; azo-based pigments, such as monoazo, disazo, and polyazo compounds; yellow pigments, such as isoindolinone, chrome yellow, iron oxide yellow, cadmium yellow, titanium yellow, and antimony; red pigments, some of which include azo-based pigments, such as monoazo, disazo, polyazo compounds, quinacridone red, and chromium bermillion; blue pigments, such as phthalocyanine blue, indanthrene blue, anthraquinone-based dye, iron blue, ultramarine blue, and cobalt blue; and green pigments such as phthalocyanine green. These mentioned above may be used alone or in combination.

Furthermore, to the pigments described above, charge control agents in the form of particles composed of electrolytes, surfactants, metallic soaps, resins, rubbers, oils, varnishes, or compounds; dispersing agents, such as titanium-based coupling agents, aluminum-based coupling agents, and silane-based coupling agents; lubricants; stabilizers; and the like may be added.

In this embodiment, a voltage generator 30 is connected to both the electrode 3 and the transparent electrode 4. This voltage generator 30 generates a voltage having a voltage waveform such as that shown in FIG. 1(b). As shown in FIG. 1(b), this voltage is composed of a driving voltage $V_{drive}$ and a $V_{sustain}$. In this example, the driving voltage $V_{drive}$ is approximately 15 to 50 V, and the application time Td thereof is approximately several ten to several hundred milliseconds. The sustaining voltage $V_{sustain}$ is approximately 3 to 25 V in this embodiment. In addition, the level of the sustaining voltage is set lower than that of the driving voltage.

Next, operation of the electrophoretic device of this embodiment will be described. In the description below, the case in which the electrophoretic particles are negatively charged will be described by way of example; however, in the case in which the electrophoretic particles are positively charged, the operation can be described in a manner similar to the above when it is considered that the movement direction of the electrophoretic particles is opposite to that in the above case.

In the electrophoretic device 20 of this embodiment, the driving voltage $V_{drive}$ is being applied across the electrodes 3 and 4 until all the electrophoretic particles 5 shown in FIG. 1(a) are completely moved from the electrode 3 to the transparent electrode 4. After all the electrophoretic particles are moved to the transparent electrode 4, the sustaining voltage $V_{sustain}$ is continuously applied. As a result, substantially all the electrophoretic particles 5 can be held at the transparent electrode 4 side for a long period of time. When the electrophoretic particles 5 have moved to the transparent electrode 4 side, the display surface of the second substrate 2 is placed in a state colored by the electrophoretic particles 5, and hence, a predetermined image is created.

In order to separate the electrophoretic particles 5 from the transparent electrode 4 side and to move them to the electrode 3 side, a driving voltage having the same drive waveform as that shown in FIG. 1(b) and the opposite polarity thereto may be applied across the electrodes 3 and 4 by the voltage generator 30. Accordingly, in a manner similar to the above, the electrophoretic particles 5 are separated from the transparent electrode 4 side and are moved to the electrode 3 side, and substantially all the electrophoretic particles 5 can be held at the electrode 3 side for a long period of time. As a result, the electrophoretic particles 5 are placed behind the dispersion medium 6 so that the display surface of the second substrate 2 is placed in the state colored by the dispersion medium 6, and hence, the display state different from that described above is obtained.

Consequently, according to the electrophoretic device 20 of this embodiment, the displaying state can be sustained for a long period of time.

Figure 2:
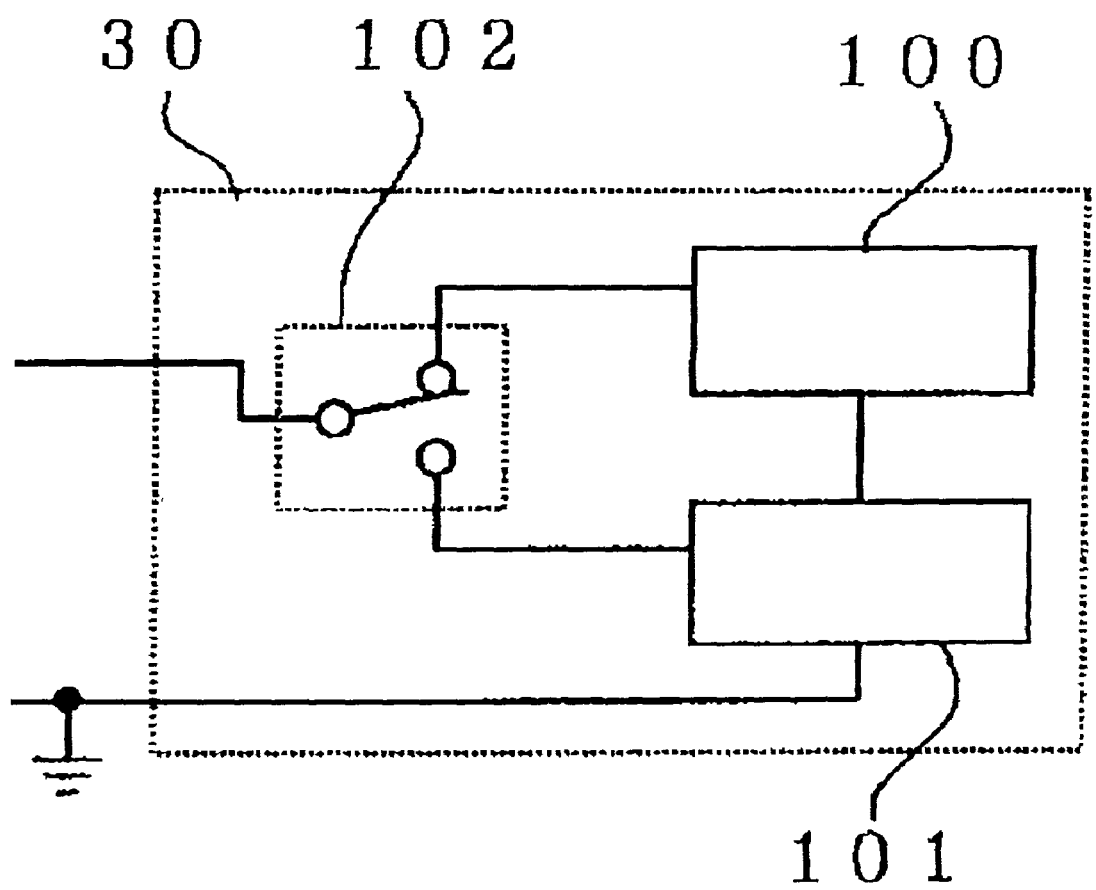
FIG. 2 is a view showing an example of the structure of the voltage generator of the electrophoretic device in FIG. 1.

The voltage generator 30 of the electrophoretic device 20 according to this embodiment may have the structure such as that shown in FIG. 2. As shown in the figure, the voltage generator 30 has first power source means 100 for supplying the driving voltage $V_{drive}$, second power source means 101 for supplying the sustaining voltage $V_{sustain}$, and switching means 102 for switching between the outputs which are supplied from the first and the second power sources. When the switching means 102 appropriately switches between the first power source means 100 and the second power source means 102, a voltage having the voltage waveform shown in FIG. 1(B) can be obtained.

Figure 3:
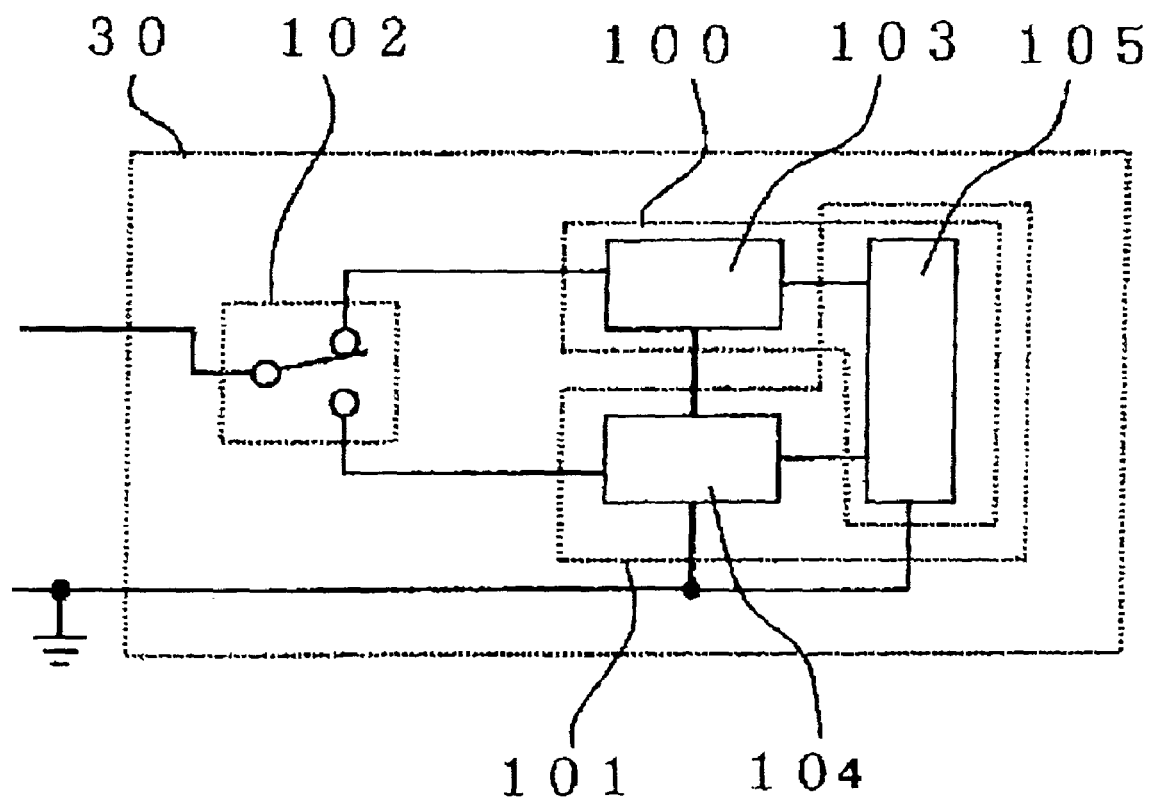
FIG. 3 is a view showing another example of the structure of the voltage generator of the electrophoretic device in FIG. 1.

In addition, the voltage generator 30 of the electrophoretic device 20 of this embodiment may have the structure such as that shown in FIG. 3. As shown in the figure, the voltage generator 30 has the first power source means 100 for supplying the driving voltage $V_{drive}$, the second power source means 101 for supplying the sustaining voltage $V_{sustain}$, and the switching means 102 for switching between the outputs which are supplied from the first and the second power sources. Furthermore, the first power source means is formed of a first voltage converter 103 and a power source device 105, and the second power source means is formed of a second voltage converter 104 and the power source device 105. That is, the first power source means and the second power source means commonly use the same power source device 105. As in the case shown in FIG. 2, when the switching means 102 appropriately switches between the first power source means 100 and the second power source means 102, a voltage having the voltage waveform shown in FIG. 1(B) can be obtained. When one part of the first power source means and one part of the second power source means are common to each other, as described above, the size of the voltage generator 30 can be decreased.

Figure 4:
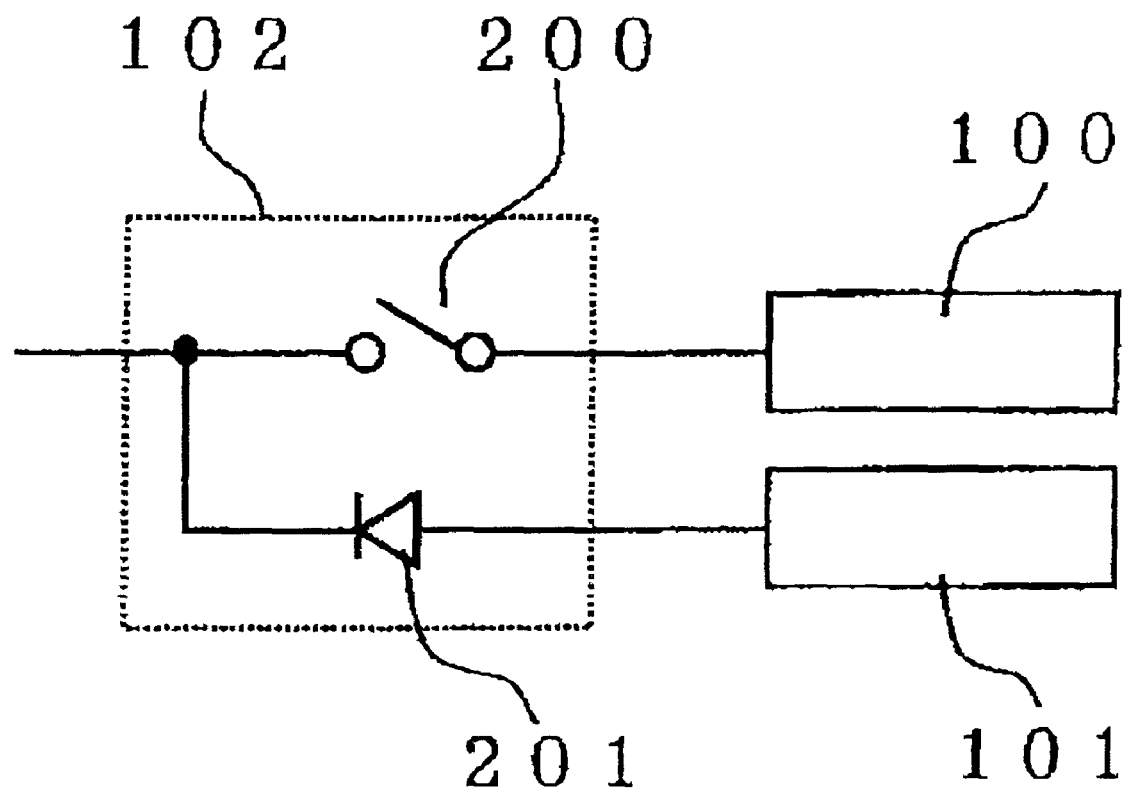
FIG. 4 is a view showing an example of the structure of switching means 102.

The switching means 102 may have the structure such as that shown in FIG. 4. As shown in the figure, the output of the first power source means 100 is connected to the output of the switching means 102 via a switch 200, the output of the second power source means 101 is connected to the anode of a diode 201, and the cathode of the diode 201 is connected to the output side of the switching means 102 of the switch 200. According to the structure described above, by the operation of the switch 200, the driving voltage and the sustaining voltage can be switched. In the above description, both the driving voltage and the sustaining voltage have been considered positive; however, when both of them are negative, the same structure as that described above can be formed by simply changing the connection direction of the diode.

Figure 5:
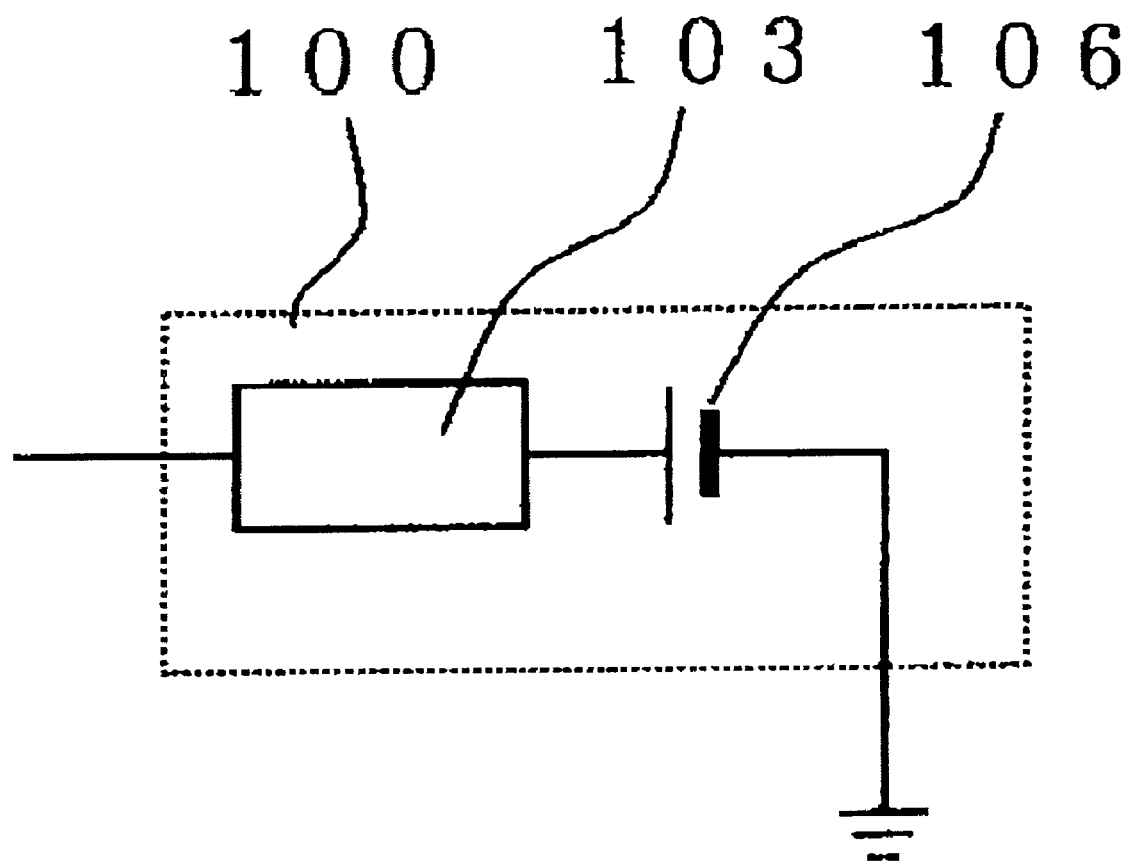
FIG. 5 is a view showing an example of the structure of first power source means 100.

The first power source means 100 may have the structure such as that shown in FIG. 5. As shown in the figure, the first power source means 100 is formed of the first voltage converter 103 and a battery 106. By using the battery, the efficiency and the reliability of the power source means can be improved. In addition, when the stability of output voltage of the battery 106 is sufficient in practice, the voltage converter 103 can be omitted. Heretofore, the first power source means 100 has been described, and naturally, the same structure as that described above may be applied to the second power source means 101.

Figure 6:
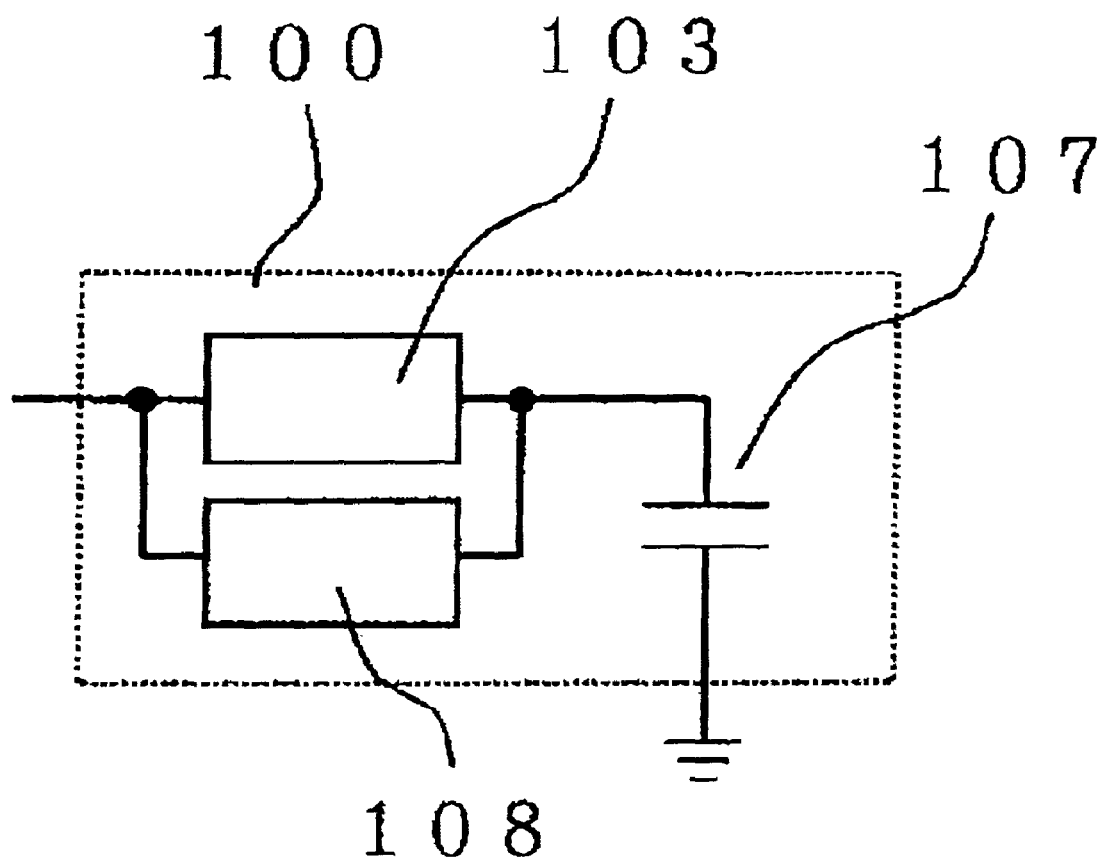
FIG. 6 is a view showing another example of the structure of first power source means 100.

In addition, the first power source means 100 may have the structure such as that shown in FIG. 6.

As shown in the figure, the first power source means 100 is formed of first voltage converter 103, a capacitor 107, and a charge control device 108. By using the capacitor, the efficiency and the reliability of the power source means can be improved. In addition, when the stability of output voltage of the capacitor 106 is sufficient in practice, the voltage converter 103 can be omitted. The first power source means 100 has been described, and naturally, the same structure as that described above may be applied to the second power source means 101.

SECOND EXAMPLE

Figure 7:
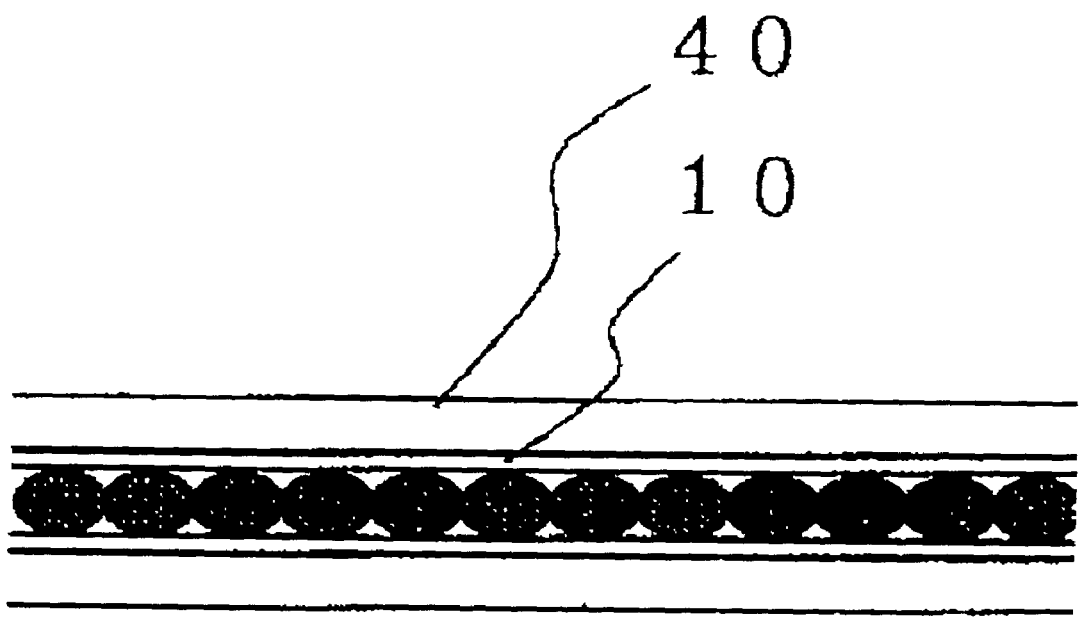
FIG. 7 is a view showing an electrophoretic device of a second embodiment according to the present invention.

FIG. 7 is a view showing an electrophoretic device of a second embodiment of the present invention. In the electrophoretic device shown in the figure, the electrophoretic dispersion 10 is enclosed in microcapsules 40 and is placed as a microcapsule layer between the substrates together with a binder. Since being filled in the microcapsules, the electrophoretic dispersion becomes easier to handle, and hence, the manufacturing process can be simplified.

As a material for forming the microcapsule 40, for example, a material having flexibility such as a gum arabic-gelatin-based compound or a urethane-based compound is preferably used. In addition, microcapsules approximately equivalent to each other in size are preferably used in order to obtain superior display performance. The microcapsules approximately equivalent to each other in size can be obtained by, for example, filtration, gravity classification, or the like. In general, the size of the microcapsule is approximately 30 to 60 μm.

The microcapsule layer may be formed by steps of mixing the microcapsules 40 described above, a desired dielectric constant controller, and a binder resin and applying the resin composition (emulsion or organic solvent solution) thus formed to the substrate by a known coating method, such as a roll coating method, a roll laminating method, a screen printing method, or a spray coating method.

The binder resin used in this embodiment is not specifically limited as long as it has a superior affinity for the microcapsule 40, superior adhesion to the substrate, and insulating properties. As the binder resins, for example, there may be mentioned thermoplastic resins, such as polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, poly(vinyl alcohol), poly(vinyl formal), and cellulose-based resin; polymers, such as polyamide resin, polyacetal, polycarbonate, poly(ethylene terephthalate), poly(butylene terephthalate), poly(phenylene oxide), polysulfone, poly(amide imide), poly(amino bismaleimide), poly(ether sulfone), poly(phenylene sulfone), polyarylate, grafted poly(phenylene ether), poly(ether ether ketone), and poly(ether imide); fluorinated resins, such as poly(tetrafluoroethylene), poly(fluoroethylene propylene), tetrafluoroethylene-perfluoroalkoxyethylene copolymer, ethylene-tetrafluoroethylene copolymer, poly(vinylidene fluoride), poly(chlorotrifluoroethyelene), and fluorinated rubber; silicon-based resins, such as organic silicone resin and silicone rubber; and others, such as methacrylic acid-styrene copolymer, polybutylene, and methyl methacrylate-butadiene-styrene copolymer.

In addition, concerning the binder, as disclosed in Japanese Unexamined Patent Application Publication No. 10-149118, it is preferable that the dielectric constant of the electrophoretic display solution be approximately equivalent to that of a dispersing material. Accordingly, it is preferable that alcohols, ketones, salts of carboxylic acids, or the like be further added to the binder resin composition described above. As the alcohols mentioned above, 1,2-butanediol, 1,4-butanediol, or the like may be used.

Figure 9:
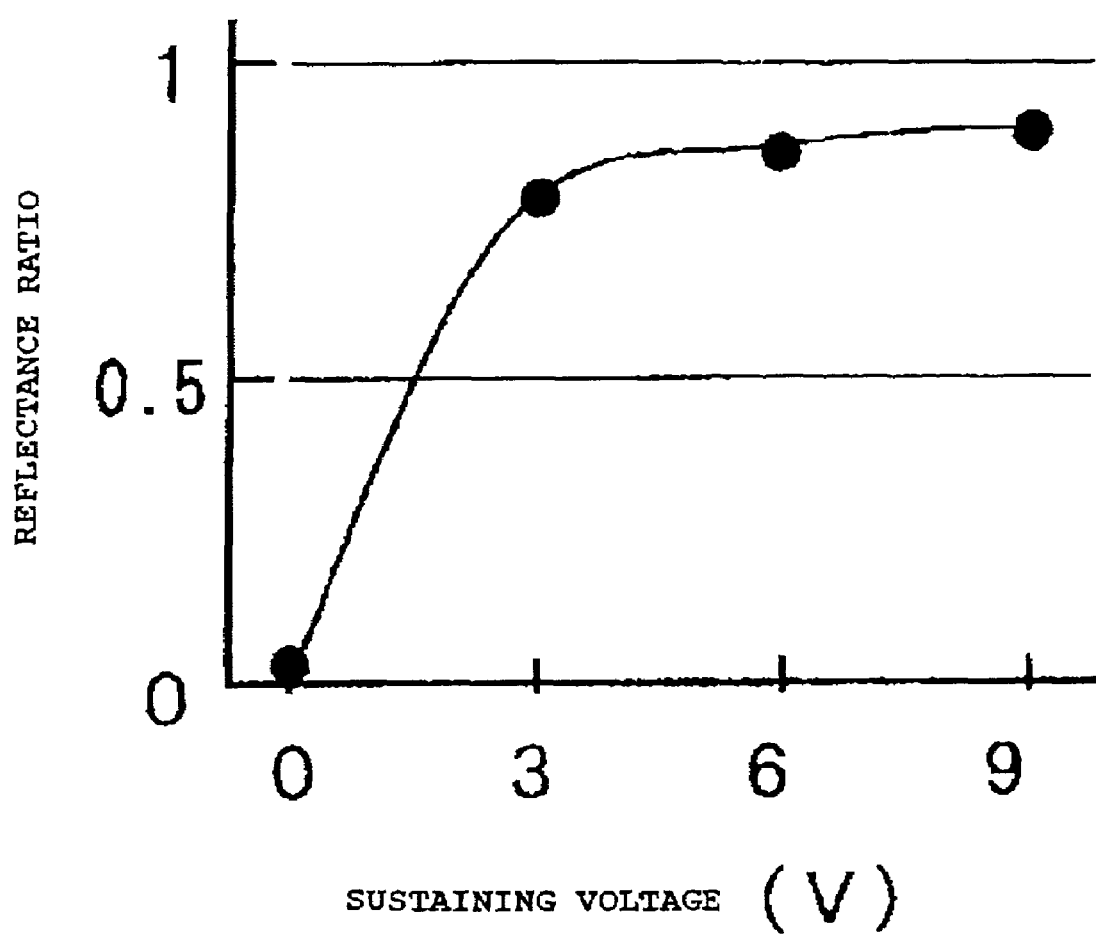
FIG. 9 is a view showing an example of measured data on the relationship between the level of a sustaining voltage and optical concentration obtained by the electrophoretic device of a second example according to the present invention.
Figure 10:
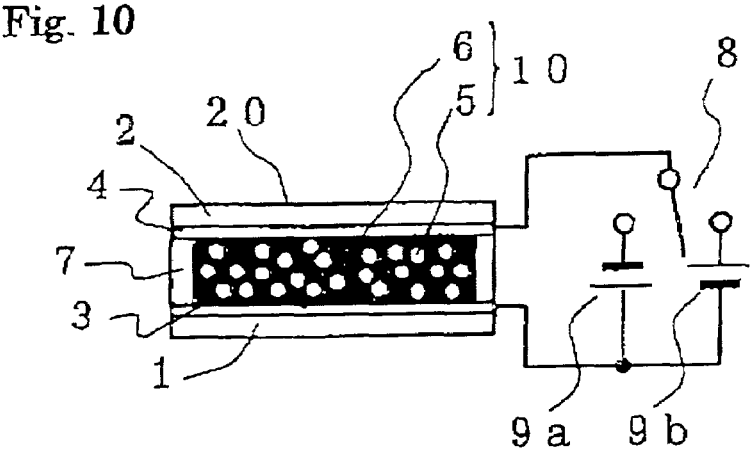
FIG. 10 includes views showing an example of a general electrophoretic device, FIG. (a) is a view showing the structure thereof, and FIGS. (b) and (c) are views showing a principle for displaying images.
Figure 10:
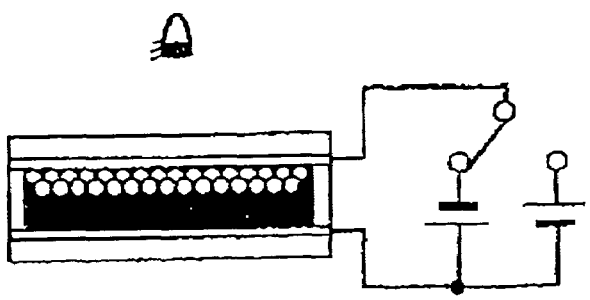
Figure 10:
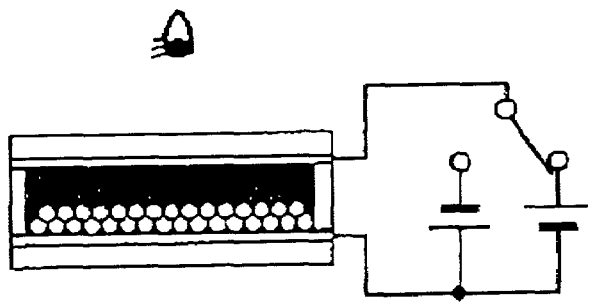

FIG. 9 shows one example of the measured data on the relationship between the level of the sustaining voltage and image-sustaining properties of the electrophoretic device of the second example according to the present invention. In this measurement, a driving voltage of 20 V was applied for 1 second, sustaining voltages of 0, 3, 6, and 9 V were then applied and sustained for one week, and subsequently, the reflectance was measured. In the figure, the ratio of the reflectance thus measured to the reflectance measured right after the application of the driving voltage is shown. As shown in the figure, even when the level of the sustaining voltage is not more than half the driving voltage, image-sustaining properties sufficient in practice can be obtained. By decreasing the level of the sustaining voltage to not more than half that of the driving voltage, while the image-sustaining properties, which are sufficient in practice, are sustained, the amount of electrical power for sustaining the image can be decreased.

THIRD EXAMPLE

Figure 8:
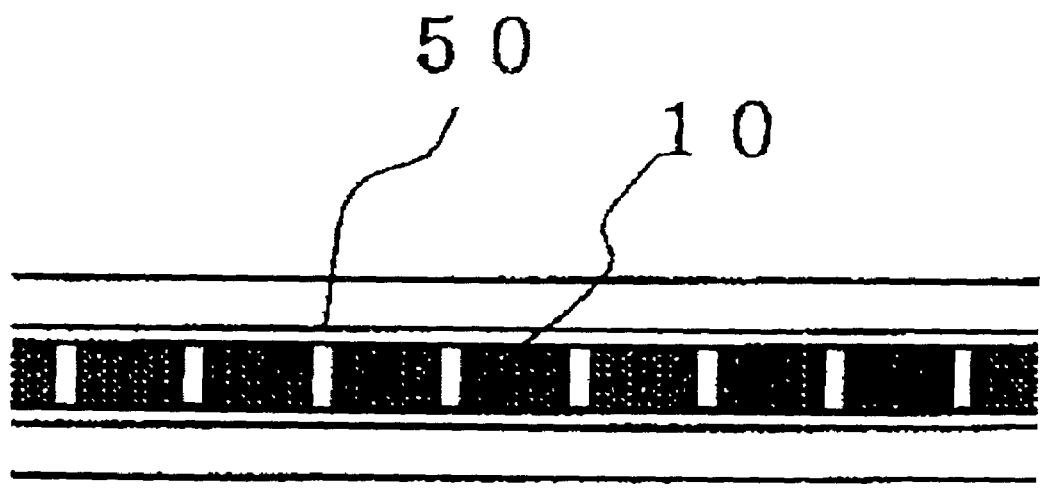
FIG. 8 is a view showing an electrophoretic device of a third embodiment according to the present invention.

FIG. 8 is a view showing an electrophoretic device of a third embodiment according to the present invention. In this electrophoretic device shown in this figure, the electrophoretic dispersion 10 is divided by partitions 50. The pitches between the partitions are approximately 10 μm to 1 mm. By dividing the electrophoretic dispersion using the partitions, unnecessary movement of the particles and unnecessary agglomeration between the particles can be avoided, and hence, the display quality can be improved.

In the examples described above, the structure in which the electrophoretic dispersion is provided between the pair of the substrates is described; however, the present invention is not limited thereto and may be applied to electrophoretic devices having an electrophoretic dispersion provided on electrodes which are laminated to each other or which are disposed in the horizontal direction.

The electrophoretic device of the present invention may be applied to various electronic apparatuses provided with a display portion. Hereinafter, electronic apparatuses provided with the electrophoretic device of the present invention will be described by way of example.

Figure 11:
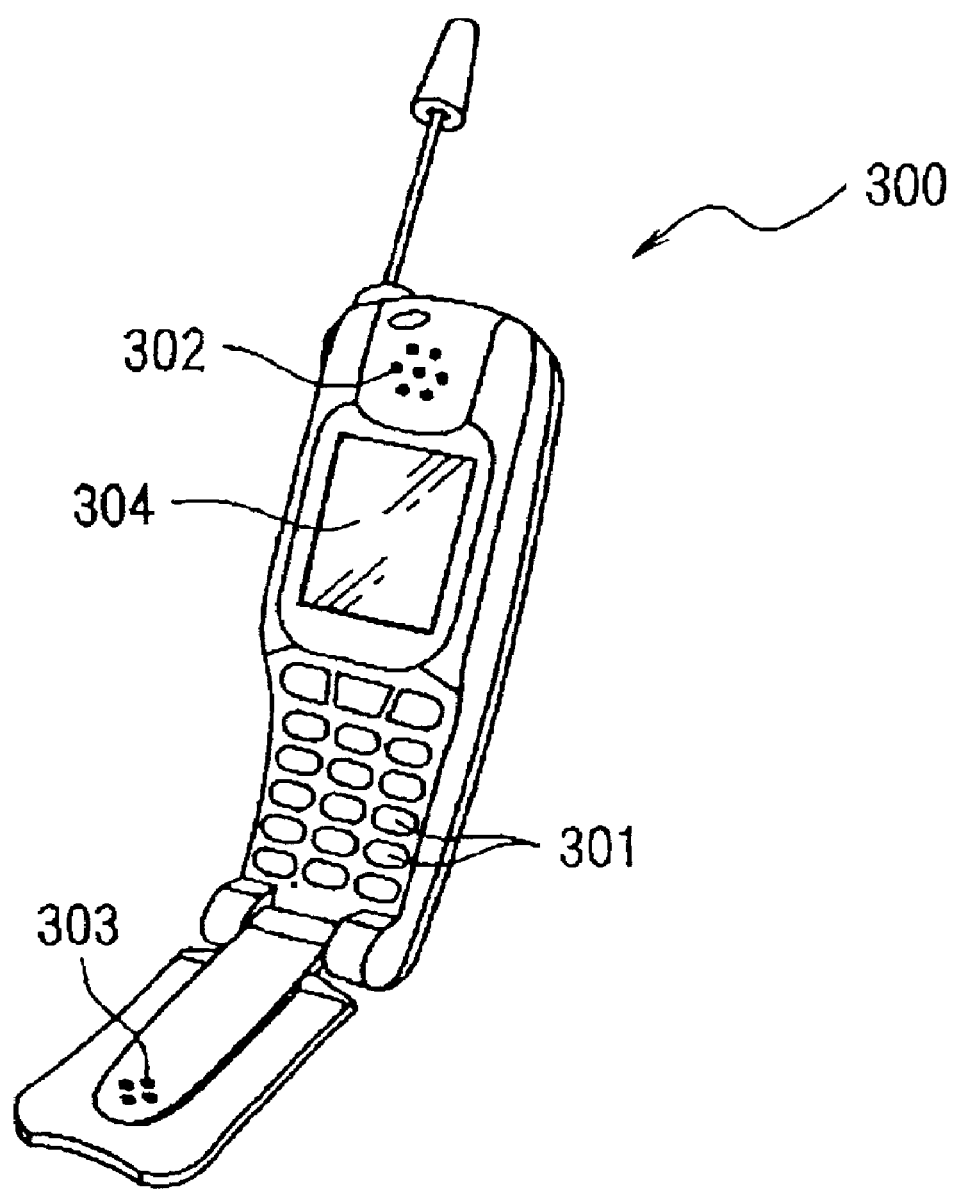
FIG. 11 is a perspective view showing the structure of a mobile phone.

FIG. 11 is a perspective view showing the structure of a mobile phone.

A mobile phone 300 comprises a plurality of operation buttons 301, an earpiece 302, a mouthpiece 303, and a display panel 304. In this mobile phone 300, the display panel 304 is formed of the electrophoretic device described above.

Figure 12:
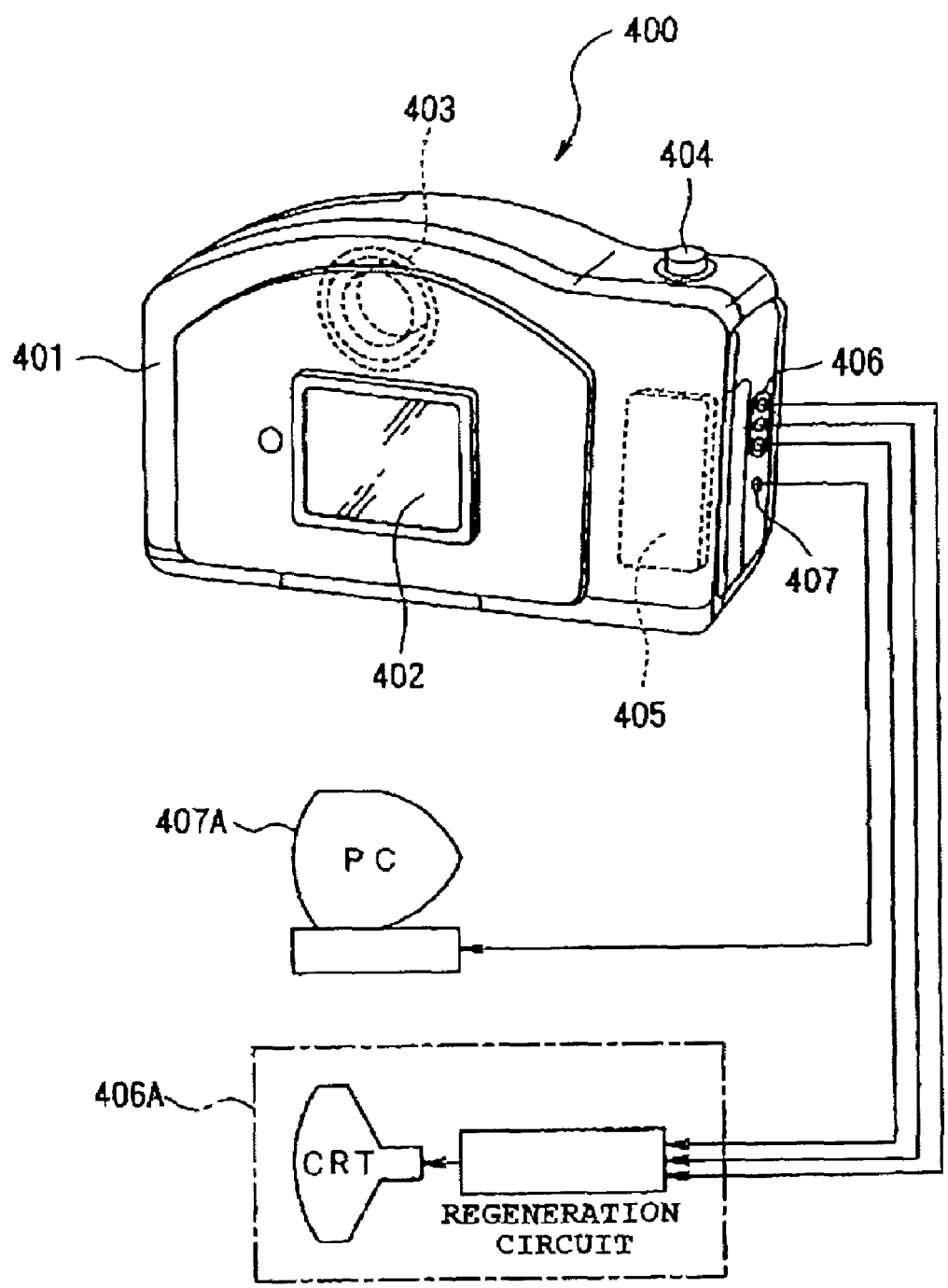
FIG. 12 is a perspective view showing the structure of a digital still camera.

FIG. 12 is a perspective view showing the structure of a digital still camera. The connection with an external apparatus is also shown briefly.

A digital still camera 400 comprises a case 401, a display panel 402 which is provided at the rear side of the case 401 and which performs display in accordance with an image signal supplied by an CCD (Charge Coupled Device), a light-receiving unit 403 which is composed of optical lenses, the CCD, and the like and which is provided at the observer side (the rear surface side in the figure) of the case 401, and a shutter button 404, and a circuit substrate 405 which receives and saves an image signal, which is obtained when the shutter button 404 is pressed and which is supplied from the CCD. In this digital still camera 400, the display panel 402 is formed of the electrophoretic device described above.

On the side surface of the case 401 of the digital still camera 400, a video signal output terminal 406 and a data communication input-output terminal 407 are provided, and when necessary, the former and the latter are connected to a television monitor 406A and a personal computer 407A, respectively. In addition, in response to a predetermined operation, the image signal saved in a memory of the circuit substrate 405 is output to the television monitor 406A or the personal computer 407A.

Figure 13:
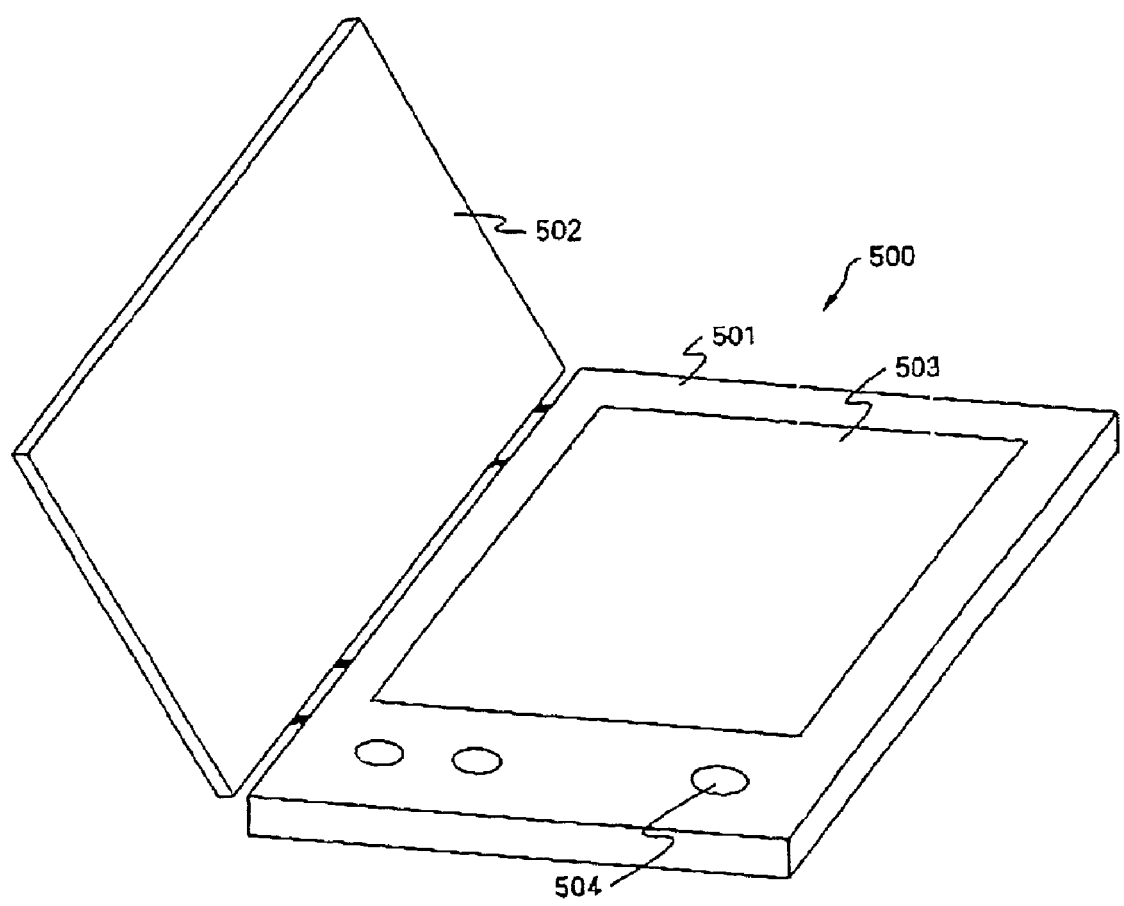
FIG. 13 is a perspective view showing the structure of an electronic book.

FIG. 13 is a perspective view showing the structure of an electronic book.

An electronic book 500 comprises a book-shaped frame 501 and a cover 502 capable of opening and closing provided on this frame 501, and on the surface of the frame 501, there are provided an operation portion 504 and a display device 503 having a display surface in an exposed state. In this electronic book 500, the display device 503 is formed of the electrophoretic device described above.

Figure 14:
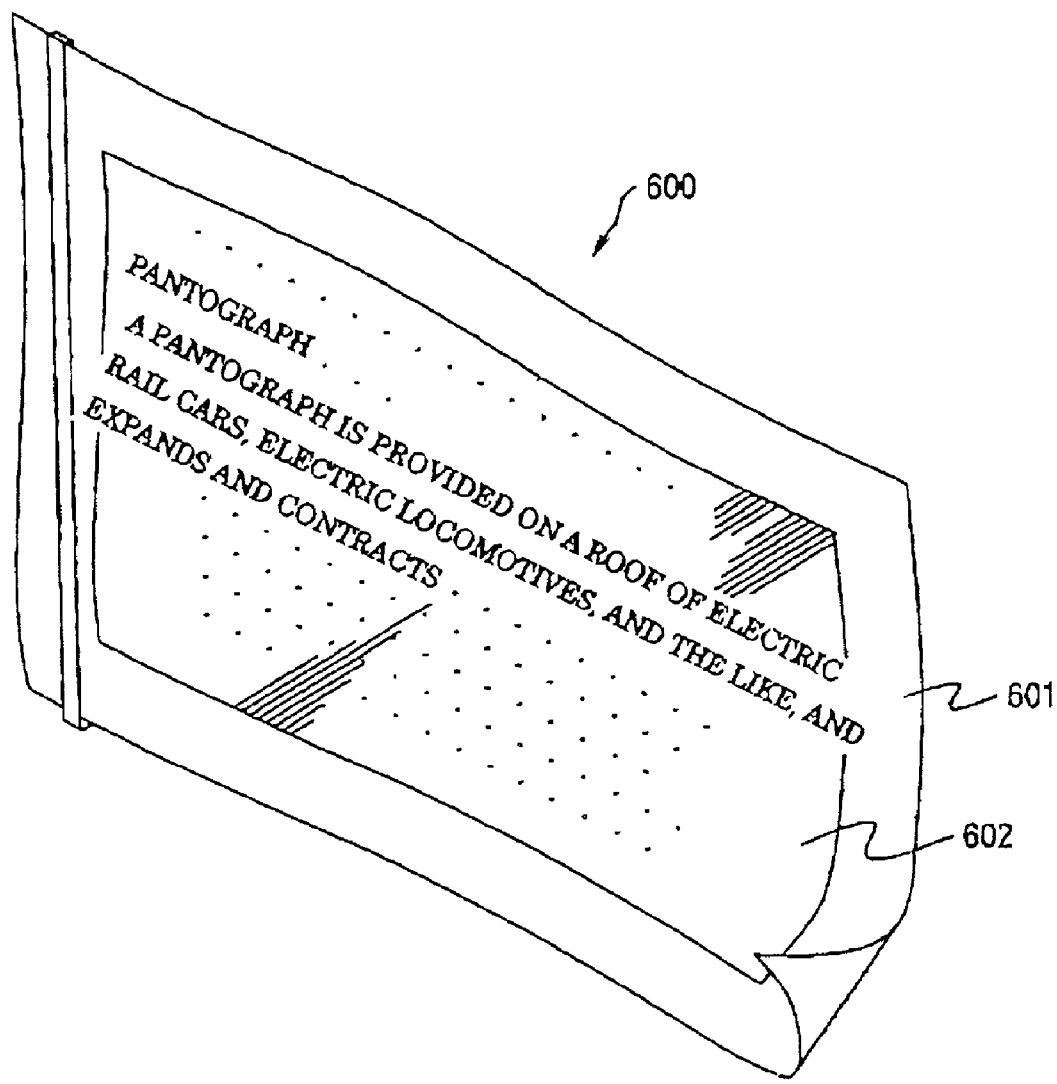
FIG. 14 is a perspective view showing the structure of electronic paper.

FIG. 14 is a perspective view showing the structure of electronic paper.

Electronic paper 600 comprises a display unit 602 and a main body 601 composed of a rewritable sheet having the texture and flexibility similar to those of paper. In this electronic paper 600, the display unit 602 is formed of the electrophoretic device described above.

Figure 15:
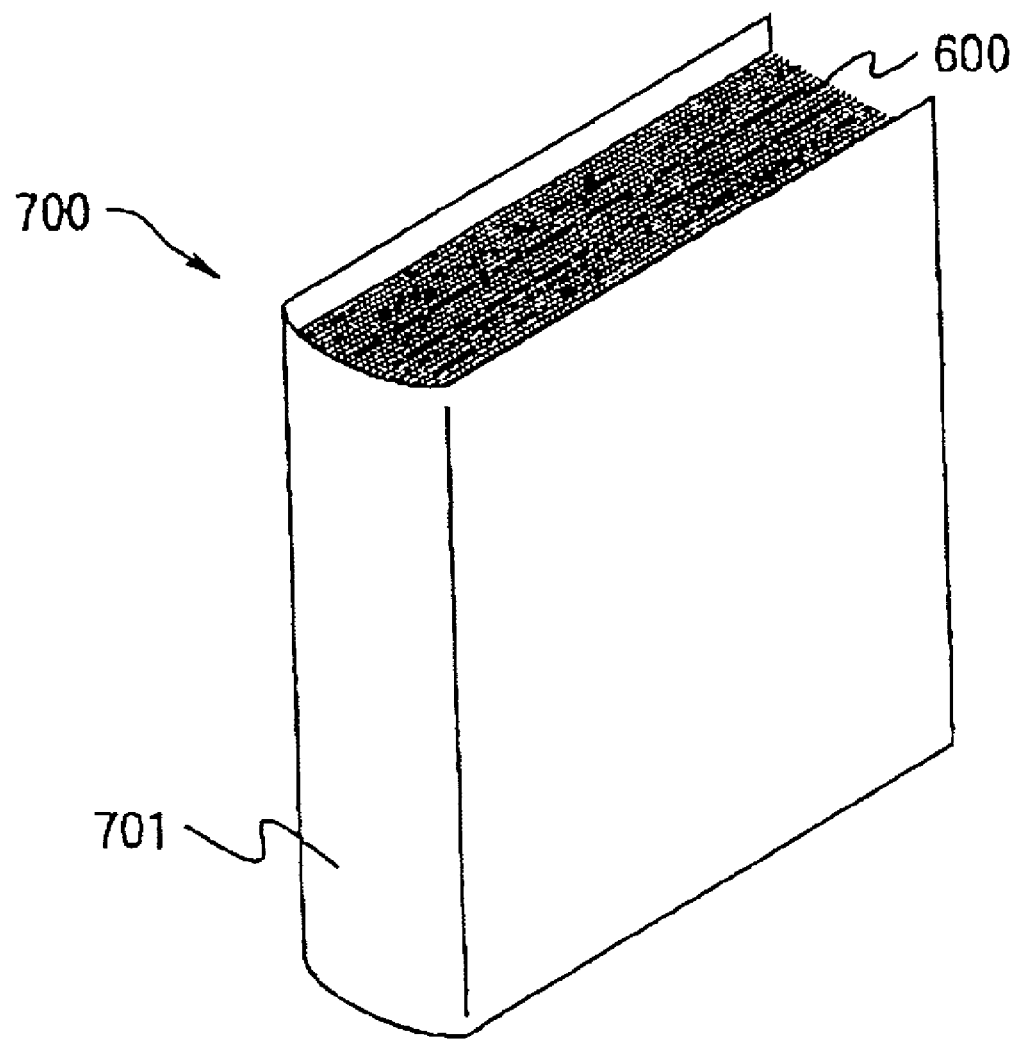
FIG. 15 is a perspective view showing the structure of an electronic notebook.

FIG. 15 is a perspective view showing the structure of an electronic notebook using the electronic paper shown in FIG. 14.

An electronic notebook 700 comprises a stack of electronic paper 600 and a cover 701 which is folded in half so as to sandwich the stack of electronic paper 600, and when the cover 701 is provided with data display input means, the display content can be changed while the electronic paper 600 is in a stacked state. In this electronic notebook 700, the electronic paper 600 is formed of the electrophoretic device described above.

Figure 16:
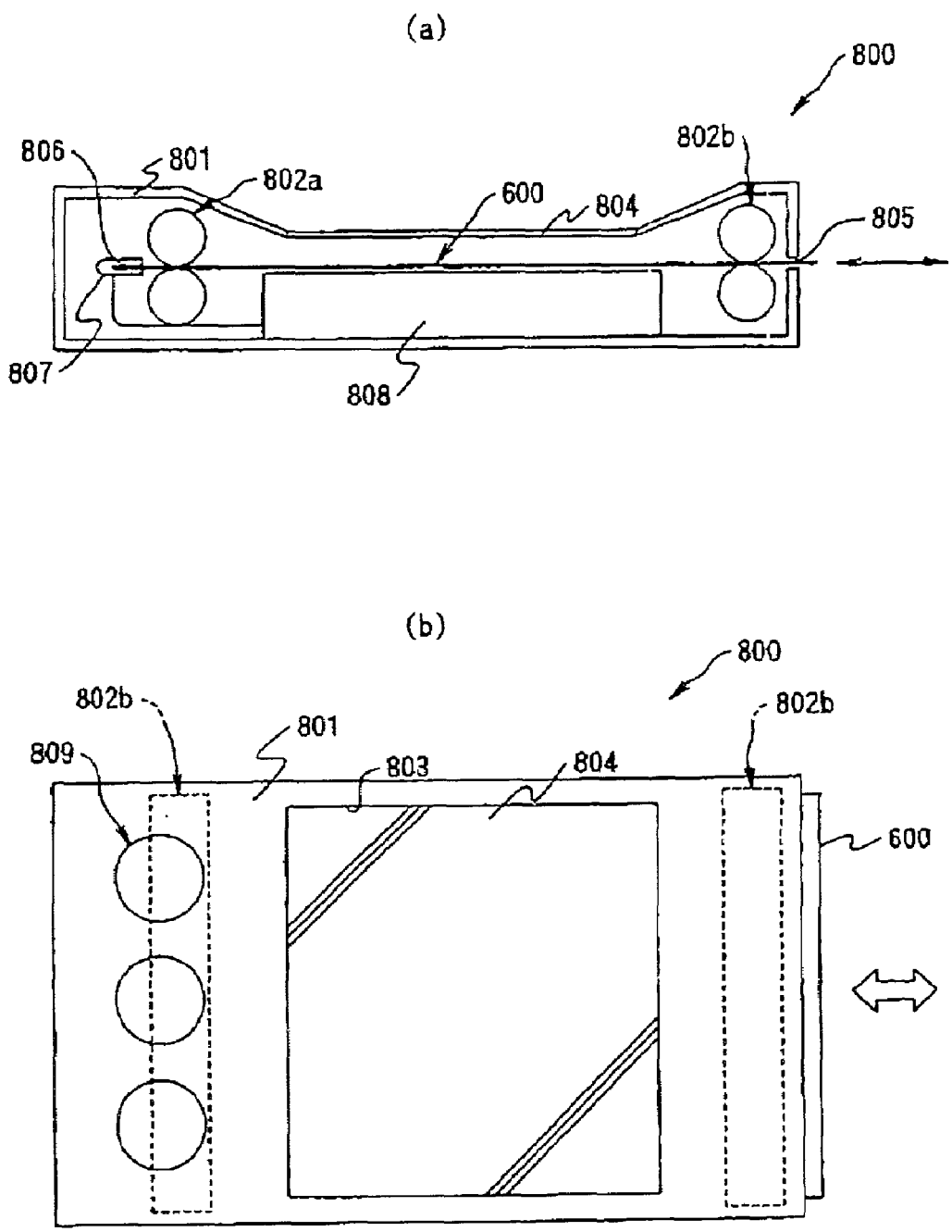
FIG. 16 is a view showing the structure of a display device using electronic paper.

FIG. 16 includes views showing another structure of a display device 800 provided with the electronic paper shown in FIG. 14, FIG. 16(a) is a cross-sectional view, and FIG. 16(b) is a plan view.

The display device 800 comprises a main body 801 having two pairs of transfer rollers 802a and 802b; the electronic paper 600 which is held between each of the pairs of transfer rollers 802a and 802b provided in the main body 801; a transparent glass plate 804 which is fitted in a rectangular recess 803 provided at the display surface side of the main body 801; a loading slot provided at one end of the main body 801 for detachably inserting the electronic paper 600 thereinto; a controller 808 connectable to a terminal portion 806 provided at the front end in the inserting direction of the electronic paper 600 via a socket 807; and an operation portion 809. In this display 800, the electronic paper 600 is formed of the electrophoretic device described above.

In this display device 800, the display surface is formed so that the electronic paper 600 placed in the main body 801 is viewed through the transparent glass plate 804. This electronic paper 600 is detachably placed in the main body 801 and may be removed from the main body 801 to use as portable electronic paper.

As the electronic apparatuses, in addition to those described above, there may be mentioned televisions, viewfinder type and direct viewing type video tape recorders, car navigation apparatuses, pagers, electronic pocketbooks, electronic calculators, word processors, personal computers, workstations, television phones, POS terminals, and apparatuses provided with touche panels, and for the display portion of the electronic apparatuses mentioned above, the electrophoretic device formed by the method described above maybe used.

(Advantages)

As has thus been described, according to the present invention, by applying the driving voltage for rewriting a display and subsequently sustaining the sustaining voltage until the display is rewritten, a desired dispersion state of the electrophoretic particles is maintained, so that an advantage is obtained in that image-sustaining properties can be improved.

The invention claimed is:

1. A method for driving an electrophoretic device including an electrophoretic dispersion which contains a liquid-phase dispersion medium and electrophoretic particles dispersed therein, the positions of the electrophoretic particles being controlled in accordance with an electric field applied thereto, the method comprising:
   a first step of applying a first DC voltage to the electrophoretic particles so as to change a first dispersion state thereof into a second dispersion state; and
   a second step of switching from the first DC voltage to a second DC voltage and applying the second DC voltage to the electrophoretic particles so as to substantially sustain the second dispersion state,
   wherein the first DC voltage has a first polarity, the second DC voltage has a second polarity, and the first polarity is the same as the second polarity.

2. The method for driving the electrophoretic device according to claim 1, wherein the first DC voltage has a first absolute value, the second DC voltage has a second absolute value, and the first absolute value is larger than the second absolute value.

3. The method for driving the electrophoretic device according to claim 1, wherein at least one of the first DC voltage and the second DC voltage is applied from a battery.

4. The method for driving the electrophoretic device according to claim 1, wherein at least one of the first DC voltage and the second DC voltage is applied from a capacitor.

5. The method according to claim 4, wherein the first voltage has a first voltage level, the second voltage has a second voltage level, and the first voltage level is greater than two times as high as the second voltage level.

6. The method according to claim 4, further comprising outputting each of the first voltage and the second voltage to the electrophoretic particles through a switch.

7. The method according to claim 4, further comprising controlling outputs of the first voltage and the second voltage with a switch.

8. The method according to claim 4, wherein each of the first voltage and the second voltage are a DC voltage.

9. The method according to claim 8, wherein the first voltage has a first polarity, the second voltage has a second polarity, and the first polarity is the same as the second polarity.

10. The method for driving the electrophoretic device according to claim 1, wherein the first DC voltage has a first level, the second DC voltage has a second level, and the second level is not more than half of the first level.

11. A method for driving an electrophoretic device including an electrophoretic dispersion which contains a liquid-phase dispersion medium and electrophoretic particles dispersed in the liquid-phase dispersion medium, the method comprising:
   applying a first voltage to the electrophoretic particles so as to change a first dispersion state of the electrophoretic particles into a second dispersion state of the electrophoretic particles;
   outputting a second voltage from a first capacitor; and
   applying the second voltage to the electrophoretic particles so as to substantially sustain the second dispersion state.

12. The method according to claim 11, further comprising outputting the first voltage from a second capacitor.

13. The method according to claim 11, wherein the first capacitor stabilizes the second voltage.

14. The method according to claim 11, wherein the first voltage has a first voltage level, the second voltage has a second voltage level, and the first voltage level is two times as high as the second voltage level.

* * * * *